United States Patent [19]
Jirkovsky

[11] 3,720,711
[45] March 13, 1973

[54] DERIVATIVES OF 6-OXO-1-CYCLOHEXENE-1-CARBOXAMIDE

[75] Inventor: Ivo L. Jirkovsky, Montreal, Quebec, Canada

[73] Assignee: American Home Products Corporation, New York, N.Y.

[22] Filed: Nov. 2, 1971

[21] Appl. No.: 195,037

[52] U.S. Cl............260/557 R, 260/551 S, 424/320, 424/324
[51] Int. Cl.............................................C07c 103/86
[58] Field of Search..............................260/551, 557

[56] References Cited

UNITED STATES PATENTS 3,470,174   9/1969   Alt........................................260/557

Primary Examiner—Harry I. Moatz
Attorney—Vito Victor Bellino et al.

[57] ABSTRACT

Carboxamides and thiocarboxamides characterized by having an aminoalkylamino, lower alkylaminoalkylamino, di(lower)alkylaminoalkylamino or hydroxyalkylamino radical attached to position 2 of a 6-oxo-1-cyclohexene-1-carboxamide or 6-oxothio-1-cyclohexene-1-carboxamide with optional alkyl groups at position 4 are disclosed. The nitrogen atom of the carboxamido or thiocarboxamido radical may be substituted with an alkyl, aryl or optionally substituted aryl. The compounds are useful antiinflammatory, analgetic, antibacterial and antifungal agents and methods for their preparation and use are disclosed.

12 Claims, No Drawings

DERIVATIVES OF 6-OXO-1-CYCLOHEXENE-1-CARBOXAMIDE

BACKGROUND OF THE INVENTION

This invention relates to carboxamides and thiocarboxamides. More particularly, this invention relates to new 6-oxo-1-cyclohexene-1-carboxamides and 6-oxothio-1-cyclohexene-carboxamides having an aminoakylamino or hydroxyalkylamino radical attached to position 2 thereof, to processes for their preparation and to intermediates used in these processes.

The 6-oxo- and 6-oxothio-1-cyclohexene-1-carboxamides of the present invention are most readily distinguished from compounds of the prior art by the nature of their substitution at position 2 and by their valuable pharmacologic properties. For example, 2-amino- and 2-methylamino-4,4-dimethyl-N-phenyl-6-oxothio-1-cyclohexene-1-carboxamides, i.e., 2-amino and 2-alkyl amino derivatives of 6-oxothio-1-cyclohexane-1-carboxamide, have been reported in a publication by J. Goerdeler and U. Keuser, Chem. Ber., 97, 2209 (1964); whereas the compounds of this invention are 2-(aminoalkylamino), 2-(lower alkylaminoalkylamino, 2-[di(lower)-alkylaminoalkylamino], or 2-hydroxyalkylamino derivatives of 6-oxo- and 6-oxothio-1-cyclohexene-1-carboxamides. Furthermore the carboxamides and thiocarboxamides of this invention possess valuable pharmacologic properties. For example, the compounds of this invention exhibit antiinflammatory and analgetic activities at dose levels that do not elicit undesirable side effects. In addition these compounds exhibit antibacterial and antifungal properties.

These properties render the carboxamide and thiocarboxamides of of this invention useful for the treatment of inflammatory conditions and infectious diseases.

SUMMARY OF THE INVENTION

The carboxamides and thiocarboxamides of this invention are characterized by having an aminoalkylamino, lower alkylaminoalkylamino, di(lower)alkylaminoalkylamino or hydroxyalkylamino radical attached to position 2 of a 6-oxo-1-cyclohexene-1-carboxamide or a 6-oxothio-1-cyclohexene-1-carboxamide with one or two optional alkyl groups at position 4. In addition the nitrogen atom of the carboxamido or thiocarboxamido radical may be substituted with an alkyl, aryl or optionally substituted aryl.

A preferred class of the carboxamides and thiocarboxamides of this invention have the formula:

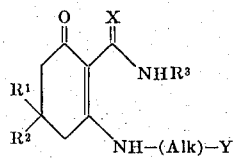

in which $R^1$ and $R^2$ both are hydrogen or lower alkyl; $R^3$ is lower alkyl, phenyl, p-halophenyl or p-lower alkoxyphenyl; X is oxygen or sulfur; and NH-(Alk)-Y represents an amino(lower)alkylamino, lower alkylamino(lower)alkylamino, di(lower)alkylamino(lower)alkylamino or hydroxy(lower)alkylamino in which Alk is an alkylene radical containing two to four carbon atoms, and Y is amino, lower alkylamino, di(lower)alkylamino or hydroxy.

The compounds of this invention of formula I are prepared by transamidation comprising treating a compound of formula II,

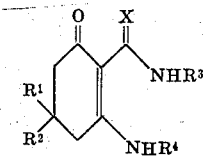

in which $R^1$, $R^2$, $R^3$ and X are as defined above and $R^4$ is benzyl or furfuryl with an amine of formula $NH_2$-(Alk)-Y in which Alk and Y are as defined above.

According to a further feature of this invention a process for the preparation of compounds of formula II is provided by treating a compound of formula III

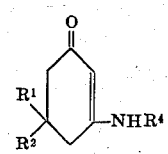

in which $R^1$, $R^2$ and $R^4$ are as defined above with an isocyanate or isothiocyanate of formula $R^3NCX$ in which $R^3$ and X are as defined above.

DETAILS OF THE INVENTION

The term "lower alkyl" as used herein contemplates both straight and branched chain alkyl radicals containing from one to six carbon atoms and includes methyl, ethyl, propyl, isopropyl, butyl, isobutyl, 2-methylpentyl and the like.

The term "halo" as used herein contemplates halogens and includes fluorine, chlorine, bromine and iodine.

The term "lower alkoxy" as used herein contemplates both straight and branched chain alkoxy radicals containing from one to six carbon atoms and includes methoxy, ethoxy, isopropoxy and the like.

Where the term "lower" is used herein as part of a description of alkylamino and dialkylamino, it contemplates one to six carbon atoms for each alkyl group and includes methylamino, n-hexylamino, dimethylamino, diethylamino and the like.

The carboxamides and thiocarboxamides of formula I in which Y is amino, lower alkylamino or di(lower)alkylamino form acid addition salts with suitable inorganic and organic acids. These salts possess the same pharmacologic activity as the parent base. Suitable acids include hydrochloric, sulfuric, phosphoric, lactic, tartaric and citric acids. These salts may be prepared by treating the appropriate carboxamide or thiocarboxamide of formula I with either one equivalent or an excess of an appropriate acid in an organic solvent, for example, ether or an ether-ethanol mixture. The additions salts thus obtained are functional equivalents of the parent compound in respect to their therapeutic use. Hence, these addition salts are included within the scope of this invention and are limited only by the requirement that the acids employed in forming the salts be pharmaceutically acceptable. Like the carboxamides or thiocarboxamides from which they may be prepared, the above acid addition salts possess a low order of toxicity.

Antiinflammatory and Analgetic Activities

The useful antiinflammatory and analgetic activities of the carboxamides and thiocarboxamides of this invention may be demonstrated in standard pharmacologic tests, for example, the tests described by R.A. Turner in "Screening Methods in Pharmacology," Academic Press, New York and London, 1965, pp. 152–163 and 100–117, respectively.

More particularly, the antiinflammatory activity of the compounds of this invention may be readily demonstrated in a modification of the Freund's adjuvant test, the adjuvant induced acute edema test as described by J.R. Boissier, et al., Therapie, 25, 43 (1970). This test is known to correlate well with data derived from clinical results with humans. Boissier et al. have demonstrated this correlation with such clinically active compounds as phenylbutazone, mefenamic acid, indomethacin, aspirin, hydrocortisone and prednisolone.

More particularly exemplified, a substantial antiiflammatory effect for the compounds listed below is demonstrable at oral doses of 100 mg/kg or less in this acute edema test. In this test male rats are treated with the test compound 1 hour before the injection of Freund's adjuvant into the paw (day 0). The rats are then treated with the same dose of the test compound for the next 3 days. The antiiflammatory effect of the test compound is measured by the reduction of pedal inflammation, see Turner cited above, and expressed as a percent inhibition from adjuvant injected control rats on day 3.

| COMPOUND | Daily Dose (mg/kg) | Percent Inhibition |
| --- | --- | --- |
| 4,4-Dimethyl-2-[3-(methylamino)propylamino]6-oxo-N-phenyl-1-cyclohexene-1-carboxamide hydrochloride, Example 65. | 100 | 36 |
| 4,4-Dimethyl-2-[3-(methylamino)propylamino]6-oxo-N-(p-chorophenyl)-1-cyclohexene-1-carboxamide hydrochloride, Example 65. | 100 | 43 |

When the compounds of this invention are employed as antiinflammatory and analgetic agents in warm-blooded animals, e.g., rats, they may be administered orally, alone or in dosage forms, i.e., capsules or tablets, combined with pharmacologically acceptable excipients, such as starch, milk sugar and so forth. They may also be administered orally in the form of solutions in suitable vehicles such as vegetable oils.

The dosage of the carboxamides and thiocarboxamides will vary with the particular compound chosen and form of administration. Furthermore, it will vary with the particular host under treatment. Generally, the compounds of this invention are administered at a concentration level that affords protective effects without any deleterious side effects. These antiinflammatorily effective concentration levels are usually obtained within a therapeutic range of 1.0 mg to 500 mg/kg per day, with a preferred range of 10 to 100 mg/kg per day.

Antibacterial and Antifungal Activity

The compounds of this invention also exhibit utility as antibacterial agents against a number of gram-positive and gram-negative microorganism, such as, *Staphylococcus pyogenes*, both penicillin sensitive and penicillin resistant, *Streptococcus faecalis*, *Escherichia coli*, *Aerobacter aerogenes*, *Salmonella pullorum*, *Pseudomonas aerugenosa*, *Proteus mirabilis*, *Proteus vulgaris*, *Klebsiella pneumoniae* and *Serratia marcescens* and as antifungal agents against a number of pathogenic fungi such as, *Candida albicans*, *Microsporum gypseum* and *Trichophyton granulosum*, in standard tests for antibacterial and antifungal activity, such as those described in "Antiseptics, Disinfectants, Fungicides and Sterilization," G.F. Reddish, Ed., 2nd ed., Lea and Febiger, Philadelphia, 1957 or by D.C. Grove and W.A. Randall in "Assay Methods of Antibiotics," Med. Encycl. Inc., New York 1955.

When the compounds of this invention are employed as antibiotic or antifungal agents in warm-blooded animals, e.g., rats, they may be administered alone or in combination with pharmacologically acceptable carriers. The proportion of the compound is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents as antibiotic or antifungal agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford antibacterially or antifungally effective results without causing any harmful or deleterious side effects and preferably at a level that is in a range of from about 1.0 mg. to about 1,000 mg. per kilo per day, although as aforementioned variations will occur. However, a dosage level that is in the range of from about 10 mg. to about 500 mg. per kilo per day is most desirably employed in order to achieve effective results.

In addition, the agents may be employed topically. For topical application they may be formulated in the form of solutions, creams, or lotions in pharmaceutically acceptable vehicles containing 0.1 –5 percent, preferably 2 percent, of the agent and may be administered topically to the infected area of the skin.

Also the antibacterial properties of the compounds of this invention may be utilized for washing equipment in hospitals, homes and farms, instruments used in medicine and bacteriology, clothing used in bacteriological laboratories, and floors, walls and ceiling in rooms in which a background free of gram-positive and gram-negative microorganisms, such as those listed above, is desired. When employed in this manner the compounds of this invention may be formulated in a number of compositions comprising the active compound and an inert material. In such compositions, while the compounds of formula I of this invention may be employed in concentrations as low as 500 p.p.m., from a practical point of view, it is desirable to use from about 0.10 percent by weight, to about 5 percent by weight or more.

The formulations that may be used to prepare antiseptic wash solutions of the compounds of this invention are varied and may readily be accomplished by standard techniques, see for example, "Remington's Practice of Pharmacy", E.W. Martin et al., Eds., 12th ed., Mack Publishing Company, Easton, Penn., 1961, pp. 1,121–1150. In general, the compounds may be made up in stock solutions. They can also be formulated as suspensions in an aqueous vehicle. These make useful mixtures for decontaminating premises. Also, aqueous vehicles containing emulsifying agents, such as sodium lauryl sulfate, and relatively high concentrations, e.g., up to about 5 percent by weight, of the compounds may be formulated by conventional techniques.

Preparation of Compounds

In practising this invention the preferred starting materials are enaminoketones of formula III. The enaminoketone, 5,5-dimethyl-3-benzylamino-2-cyclohexen-1-one (III, $R^1$ and $R^2$ = $CH_3$ and $R^4$ = benzyl), is well known and a convenient preparation for this enaminoketone from dimedone and benzylamine has been described by P. Crabbe, et al., Tetrahedron, 24, 4299 (1968). By following the procedure of Crabbe, et al., the remaining enaminoketones of formula III in which $R^1$, $R^2$ and $R^4$ are as described above may be prepared readily. For example, treating dimedone with furfurylamine gives 5,5-dimethyl-3-furfurylamino-2-cyclohexen-1-one and treating 1,3-cyclohexanedione with benzylamine or furfurylamine gives 3-benzylamino-2-cyclohexen-1-one and 3-furfurylamino-2-cyclohexen-1-one, respectively.

Treatment of the starting material of formula III with an isocyanate or isothiocyanate of formula $R^3NCX$ in which $R^3$ is as described above and X is oxygen or sulfur, yields the corresponding vinylogous amido compound of formula II in which $R^1$, $R^2$, $R^3$ and X are as described above. This process may conveniently be accomplished without a solvent but may also be effected in an inert boiling solvent, for example, benzene toluene or xylene. The temperature of the reaction may range from 80°C. to about 200°C. and reaction time from 10 minutes to about 4 days. Although the time and temperature required to effect this reaction is dependent on the reactivity of the particular isocyanate or isothiocyanate of formula $R^3NCX$ employed, reaction conditions ranging from 115° to 145°C. and one-half to 3 hours in time have been found to be convenient and practical. Furthermore it should be noted that in those cases where the reaction is performed at a temperature higher than the boiling point of the isocyanate or isothiocyanate of formula $R^3NCX$ employed it is expedient to effect the reaction in an autoclave.

The isocyanates and isothiocyanates of formula $R^3NCX$, used above, are either commercially available, for example, methyl isocyanate, phenyl isocyanate or methyl isothiocyanate or have been described in general textbooks on organic chemistry, for example, see "Rodd's Chemistry of Carbon Compounds," 2nd ed., Vol. 1C, S. Coffey, Ed., Elsevier Publishing Co., Amsterdam, 1965, pp. 357–361 and 369–373 and references therein.

Finally, the vinylogous amido compounds of formula II are treated with an amine of formula $NH_2$-(Alk)-Y in which Alk and Y are as defined above whereby transamination is effected to yield the desired carboxamides and thiocarboxamides of formula I. Again, this process is carried out conveniently without a solvent although an inert solvent, for example, toluene or xylene, may be used. A reaction temperature ranging from 100° to 200°C. and a reaction time from 1 hour to about 4 days may be used; however, temperatures ranging from 110° to 160°C and times of 12 to 24 hours have been found to be efficient and practical.

The aminoalkylamines and hydroxyalkylamines of formula $NH_2$-(Alk)-Y, used above, are either commercially available, for example, dimethylaminoethylamine, 3-methylaminopropylamine or 1-amino-2-propanol, or have been described previously, for example, see "Rodd's Chemistry of Carbon Compounds", cited above, Vol. 1D, pp. 34–43.

In a related aspect of this invention it has been found that the vinylogous amido compounds of formula II in which X is oxygen react with hydrazine whereby not only transamination is effected but also an aminopyrazole ring is formed by means of an additional mole of hydrazine reacting with the 6-oxo-1-cyclohexene-1-carboxamide moiety. In this manner, for example, 2-benzylamino-4,4-dimethyl-6-oxo-N-phenyl-1-cyclohexene-1-carboxamide reacts with excess hydrazine to yield 3-anilino-1,6,7,8-tetrahydro-7,7-dimethyl-5H-indazol-5-one hydrazone, m.p. 219°–220 °C., which on treatment with hydrochloric acid in ethanol affords 3-anilino-1,5,6,7-tetrahydro-6,6-dimethyl-4H-indazol-4-one, m.p. 270°–271°C.

The following examples will illustrate further this invention.

EXAMPLE 1

2-Benzylamino-4,4-dimethyl-6-oxo-N-phenyl-1-cyclohexene-1-carboxamide (II; $R^1$ and $R^2$ = $CH_3$, $R^3$ = phenyl, $R^4$ = benzyl and X = O)

A mixture of the enaminoketone of formula III, 3-benzylamino-5,5-dimethyl-2-cyclohexen-1-one (20.0 g), prepared as described by P. Crabbe, et al., cited above, and 12 g. of phenyl isocyanate, are heated at 130°–5 with stirring for 90 min. The resulting amber-like material is directly crystallized from ethanol to give the title compound as white crystals; m.p. 134°C, $\lambda_{max}^{EtOH}$ 295 nm ($\epsilon$ = 32,050); $\gamma_{max}^{CHCl}$ 3,000, 1,630, 1,535 cm$^{-1}$.

In the same manner but replacing 3-benzylamino-5,5-dimethyl-2-cyclohexen-1-one with an equivalent amount of 3-furfurylamino-5,5-dimethyl-2-cyclohexen-1-one, prepared from dimedone and furfurylamine according to the procedure of Crabbe et al., cited above, the title compound is also obtained.

In the same manner but replacing phenyl isocyanate with an equivalent amount of p-chlorophenyl isocyanate, the p-chloro analog of the title compound, 2-benzylamino-4,4-dimethyl-6-oxo-N-(p-chlorophenyl)-1-cyclohexene-1-carboxamide, m.p. 202°–204°C, $\lambda_{max}^{EtOH}$ 297 nm ($\epsilon$ = 39,000), is obtained.

The procedure of Example 1 may be followed to prepare other vinylogons amido compounds of formula II in which $R^1$, $R^2$, $R^3$ and $R^4$ are as defined in the first instance and X is oxygen. Examples of such compounds are listed in Table I. In each of these examples the requisite enaminoketone of formula III and the isocyanate ($R^3$NCO) are used as starting materials in the same proportions as described for 3-benzylamino-5,5-dimethyl-2-cyclohexene-1-one and phenyl isocyanate in Example 1.

The requisite enaminoketones are prepared according to the procedure of Crabbe et al., cited above, using benzylamine or furfurylamine together with either 1,3-cyclohexanedione, described by H. Stetter and W. Dierichs, Chem. Ber., 85, 61 (1952), dimedone, 5,5-diethyl-1,3-cyclohexanedione, described by G.A.R. Kon and R.P. Linstead, J. Chem. Soc., 815 (1925) and 5,5-dipropyl-1,3-cyclohexanedione, prepared from 3,3-dipropylacrylic acid [G.A.R. Kon and B. I. Narayanan, J.Chem. Soc., 15, 36 (1927)] according to the method of Kon and Linstead, cited above, for the corresponding 5,5-diethyl derivative.

EXAMPLE 23

2-Benzyl-4,4-dimethyl-N-phenyl-6-oxothio-1-cyclohexene-1-carboxamide (II; $R^1$ and $R^2$ = $CH_3$, $R^3$ = phenyl, $R^4$ = benzyl and X = S)

A mixture of the enaminoketone of formula III, 3-benzylamino-5,5-dimethyl-2-cyclohexen-1-one (2.2 g), described by P. Crabbe et al., cited above, and 1.6 g of phenyl isothiocyanate mixed and heated at 130°–5°C for 2 hours. After cooling the reaction mixture is triturated with ether. The solid is collected and washed with ether. The collected material is crystallized repeatedly from ethanol to give the title compound, m.p. 149°–150 °C, $\lambda_{max}^{EtOH}$ 279 nm ($\epsilon$ = 29,700) and 319 nm ($\epsilon$ = 20,350), $\gamma_{max}^{CHCl}$ 2,740, 1,590, 1,570, 1,515, 1,470, 1,435, 690 cm$^{-1}$.

In the same manner but replacing 3-benzylamino-5,5-dimethyl-2-cyclohexen-1-one with an equivalent amount of 3-furfurylamino-5,5-dimethyl-2-cyclohexen-1-one, the title compound is also obtained.

The procedure of Example 1 may be followed to prepare other vinylogous amido compounds of formula

TABLE I

| Example | Starting enaminoketone of Formula III $R^1$ and $R^2$ | $R^4$ | Starting isocyanate of Formula $R^3$CNO $R^3$ | Product: [(Prefix listed below)-6-oxo-1-cyclohexene-1-carboxamide] |
|---|---|---|---|---|
| 2 | H | Furfuryl | $CH_3$ | 2-furfurylamino-N-methyl. |
| 3 | H | do | $C_2H_5$ | 2-furfurylamino-N-ethyl. |
| 4 | H | do | i-$C_3H_7$ | 2-furfurylamino-N-isopropyl. |
| 5 | H | do | n-$C_6H_{13}$ | 2-furfurylamino-N-n-hexyl. |
| 6 | H | Benzyl | 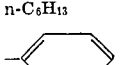 | 2-benzylamino-N-phenyl, m.p. 118° C. |
| 7 | H | Furfuryl | 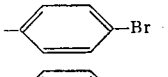—Br | 2-furfurylamino-N-(p-bromophenyl). |
| 8 | H | do | 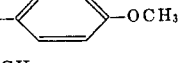—$OCH_3$ | 2-furfurylamino-N-(p-methoxyphenyl). |
| 9 | $CH_3$ | Benzyl | $CH_3$ | 2-benzylamino-4,4-dimethyl-N-methyl. |
| 10 | $CH_3$ | do | t-$C_4H_9$ | 2-benzylamino-4,4-dimethyl-N-t-butyl. |
| 11 | $CH_3$ | do | 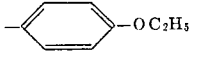—$OC_2H_5$ | 2-benzylamino-4,4-dimethyl-N-(p-ethoxyphenyl). |
| 12 | $CH_3$ | do | 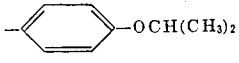—$OCH(CH_3)_2$ | 2-benzylamino-4,4-dimethyl-N-(p-isopropylphenyl). |
| 13 | $C_2H_5$ | Furfuryl | $C_2H_5$ | 2-furfurylamino-4,4-diethyl-N-ethyl. |
| 14 | $C_2H_5$ | do | —$(CH_2)_2CH(CH_3)_2$ | 2-furfurylamino-4,4-diethyl-N-(3-methylbutyl). |
| 15 | $C_2H_5$ | do |  | 2-furfurylamino-4,4-diethyl-N-phenyl. |
| 16 | $C_2H_5$ | do | 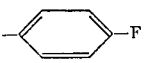—F | 2-furfurylamino-4,4-diethyl-N-(p-fluorophenyl). |
| 17 | $C_2H_5$ | do | 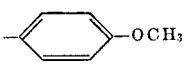—$OCH_3$ | 2-furfurylamino-4,4-diethyl-N-(p-methoxyphenyl). |
| 18 | n-$C_3H_7$ | Benzyl | $CH_3$ | 2-benzylamino-4,4-dipropyl-N-methyl. |
| 19 | n-$C_3H_7$ | do | n-$C_4H_9$ | 2-benzylamino-4,4-dipropyl-N-butyl. |
| 20 | n-$C_3H_7$ | do | 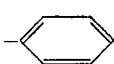 | 2-benzylamino-4,4-dipropyl-N-phenyl. |
| 21 | n-$C_3H_7$ | do | 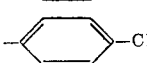—Cl | 2-benzylamino-4,4-dipropyl-N-(p-chlorophenyl). |
| 22 | n-$C_3H_7$ | do | 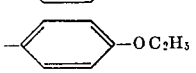—$OC_2H_5$ | 2-benzylamino-4,4-dipropyl-N-(p-ethoxyphenyl). |

II in which R¹, R², R³, and R⁴ are as defined in the first instance and X is sulfur. Examples of such compounds are listed in Table II. The requisite enaminoketone of formula III and the isothiocyanate (R³NCS) are used as starting materials in the same proportions as described for 3-benzylamino-5,5-dimethyl-2-cyclohexen-1-one and phenyl isothiocyanate in Example 23.

The preparation of the requisite enaminoketones is noted above with reference to Table I.

in boiling ethanol and small amount of ethylenediamine salt precipitated immediately. The crystallization is interrupted by filtration and the filtrate diluted with ether to precipitate this time the desirable product. Recrystallization from ethanol affords the hydrochloric acid addition salt of the title compound, 2-(2-aminoethylamino)-4,4-dimethyl-6-oxo-N-phenyl-1-cyclohexene-1-carboxamide hydrochloride, m.p. 243°–245°C., $\gamma_{max}^{Nujol}$ 2,900, 1,637 and 1,528 cm⁻¹.

TABLE II

| Example | Starting enaminoketone of Formula III R¹ and R² | R⁴ | Starting isothiocyanate of Formula R³CNS R³ | Product: [(Prefix listed below)-6-oxothio-1-cyclohexene-1-carboxamide] |
|---|---|---|---|---|
| 24 | H | Furfuryl | CH₃ | 2-furfurylamino-N-methyl. |
| 25 | H | do | C₂H₅ | 2-furfurylamino-N-ethyl. |
| 26 | H | do | n-C₆H₁₃ | 2-furfurylamino-N-n-hexyl. |
| 27 | H | do | –C₆H₅ | 2-furfurylamino-N-phenyl. |
| 28 | H | do | –C₆H₄–I | 2-furfurylamino-N-(p-iodophenyl). |
| 29 | H | do | –C₆H₄–OCH₂CH₂CH₃ | 2-furfurylamino-N-(p-propoxyphenyl). |
| 30 | CH₃ | Benzyl | CH₃ | 2-benzylamino-4,4-dimethyl-N-methyl, m.p. 183–4° C. |
| 31 | CH₃ | do | t-C₄H₉ | 2-benzylamino-4,4-dimethyl-N-t-butyl. |
| 32 | CH₃ | do | –C₆H₄–OC₂H₅ | 2-benzylamino-4,4-dimethyl-N-(p-ethoxyphenyl). |
| 33 | CH₃ | do | –C₆H₄–OCH(CH₃)₂ | 2-benzylamino-4,4-dimethyl-N-(p-isopropoxyphenyl). |
| 34 | C₂H₅ | Furfuryl | C₂H₅ | 2-furfurylamino-4,4-diethyl-N-ethyl. |
| 35 | C₂H₅ | do | –(CH₂)₂CH(CH₃)₂ | 2-furfurylamino-4,4-diethyl-N-(3-methylbutyl). |
| 36 | C₂H₅ | do | –C₆H₅ | 2-furfurylamino-4,4-diethyl-N-phenyl. |
| 37 | C₂H₅ | do | –C₆H₄–F | 2-furfurylamino-4,4-diethyl-N-(p-fluorophenyl). |
| 38 | C₂H₅ | do | –C₆H₄–OCH₃ | 2-furfurylamino-4,4-diethyl-N-(p-methoxylphenyl). |
| 39 | n-C₃H₇ | Benzyl | C₂H₅ | 2-benzylamino-4,4-dipropyl-N-ethyl-. |
| 40 | n-C₃H₇ | do | n-C₄H₉ | 2-benzylamino-4,4-dipropyl-N-butyl. |
| 41 | n-C₃H₇ | do | –C₆H₅ | 2-benzylamino-4,4-dipropyl-N-phenyl. |
| 42 | n-C₃H₇ | do | –C₆H₄–Cl | 2-benzylamino-4,4-dipropyl-N-(p-chlorophenyl). |
| 43 | n-C₃H₇ | do | –C₆H₄–OC₂H₅ | 2-benzylamino-4,4-dipropyl-N-(p-ethoxyphenyl). |

EXAMPLE 44

2-(2-Aminoethylamino)-4,4-dimethyl-6-oxo-N-phenyl-1-cyclohexene-1-carboxamide (I; R¹ and R² = CH₃, R³ = phenyl, X = O, Alk = (CH₂)₃ and Y = NH₂)

A mixture of the vinylogous amide, 2-benzylamino-4,4-dimethyl-6-oxo-N-phenyl-1-cyclohexene-1-carboxamide (6.0 g), prepared as described in Example 1, and 22 ml of the aminoalkyl-amine, ethylenediamine, are subjected to reflux for 15 hr. After cooling, the reaction mixture is dissolved in 100 ml of chloroform, washed with 2 × 30 ml of water, and then with 30 ml of 10% HCl. The chloroform layer is dried over MgSO₄, filtered, and evaporated. The solid residue is dissolved (The work-up for this acid addition salt is based on the fact that the salt is soluble in chloroform).

The title compound (free base $\gamma_{max}^{CHCl}$ 1630 cm⁻¹) is obtained by decomposing the hydrochloric acid addition salt, for example, by washing a chloroform solution of the salt with 10% sodium hydroxide solution, followed by evaporation of the solvent.

The procedure of Example 44 may be followed to prepare other compounds of formula I in which R¹, R², R³ and X are as defined in the first instance and NH-(Alk)-Y represents an amino (lower) alkylamino in which Alk is as defined in the first instance and Y is amino. Examples of such compounds are listed in Tables III and IV. The requisite vinylogous amides of formula III and aminoalkylamines are used as starting materials in the same proportions as described for the vinylogous amide and aminoalkylamine in Example 44. In each case the vinylogous amide is noted by the example describing its preparation.

TABLE III

| Ex. | No. of Example Describing the starting material | Alkylamine Alk | NH₂—(Alk)—Y Y | Product: (Prefix Listed Below)-6-Oxo-1-Cyclohexene-1-Carboxamide of Formula |
|---|---|---|---|---|
| 45 | 1 (title Compound) | $CH_2CH_2CH_2$ | $NH_2$ | 2-(3-aminopropylamino)-4,4-dimethyl-N-phenyl |
| 46 | 2 | $CH_2CH(CH_3)CH_2$ | $NH_2$ | 2-(3-amino-2-methylpropylamino)-N-methyl |
| 47 | 3 | $CH_2CH_2$ | $NH_2$ | 2-(2-aminoethylamino)-N-ethyl- |
| 48 | 7 | $CH_2CH_2CH_2CH_2$ | $NH_2$ | 2-(4-aminobutylamino)-N-(p-bromophenyl) |
| 49 | 9 | $CH_2CH_2CH_2$ | $NH_2$ | 2-(3-aminopropylamino)-4,4-dimethyl-N-methyl |
| 50 | 11 | $CH_2CH(CH_3)CH_2$ | $NH_2$ | 2-(3-amino-2-methylpropyl)-4,4-dimethyl-N-(p-ethoxyphenyl) |
| 51 | 12 | $CH_2CH_2$ | $NH_2$ | 2-(2-aminoethylamino)-4,4-dimethyl-N-(p-isopropoxyphenyl) |
| 52 | 13 | $CH_2CH_2CH_3$ | $NH_2$ | 2-(3-aminopropylamino)-4,4-diethyl-N-ethyl |
| 53 | 14 | $CH_2CH_2$ | $NH_2$ | 2-(2-aminopropylamino)-4,4-diethyl-N-(3-methylbutyl) |
| 54 | 18 | $CH_2CH(CH_3)CH_3$ | $NH_2$ | 2-(3-amino-2-methylpropylamino)-4,4-dipropyl-N-methyl |
| 55 | 19 | $CH_2CH_2CH_2CH_2$ | $NH_2$ | 2-(4-aminobutyl)-4,4-dipropyl-N-butyl |

TABLE IV

| Ex. | No. of Example Describing the Starting Material | Alkylamine Alk | NH₂—(Alk)—Y Y | Product:(Prefix Listed Below)-6-Oxothio-1-Cyclohexene-1-Carboxamide of formula |
|---|---|---|---|---|
| 56 | 23 | $CH_2CH_2CH_2$ | $NH_2$ | 2-(3-aminopropylamino)-4,4-dimethyl-N-phenyl |
| 57 | 23 | $CH_2CH_2$ | $NH_2$ | 2-(2-aminoethylamino)-4,4-dimethyl-N-phenyl |
| 58 | 24 | $CH_2CH(CH_3)CH_2$ | $NH_2$ | 2-(3-amino-2-methylpropylamino)-N-methyl |
| 59 | 25 | $CH_2CH_2CH_2CH_2$ | $NH_2$ | 2-(4-aminobutylamino)-N-ethyl |
| 60 | 30 | $CH_2CH_2CH_2$ | $NH_2$ | 2-(3-aminopropylamino)-4,4-dimethyl-N-methyl |
| 61 | 34 | $CH_2CH(CH_3)CH_2$ | $NH_2$ | 2-(3-amino-2-methylamino)-4,4-diethyl-N-ethyl |
| 62 | 35 | $CH_2CH_2$ | $NH_2$ | 2-(2-aminoethylamino)-4,4-diethyl-N-(3-methylbutyl) |
| 63 | 39 | $CH_2CH_2CH_2$ | $NH_2$ | 2-(3-aminopropylamino)-4,4-dipropyl-N-ethyl |
| 64 | 40 | $CH(CH_3)CH_2$ | $NH_2$ | *2-(2-aminopropylamino)- and 2-(2-amino-1-methylethylamino)-4,4-dipropyl-N-butyl |

*This product mixture may be separated by fractional crystallization of the hydrochloride salts.

EXAMPLE 65

4,4-Dimethyl-2-[3-(methylamino)propylamino]-6-oxo-N-phenyl-1-cyclohexene-1-carboxamide (I; $R^1$ and $R^2 = CH_3$, $R^3 =$ phenyl, $X = O$, Alk $= (CH_2)_3$ and Y $=$ NHCH₃)

A mixture of the vinylogous amide, 2-benzylamino-4,4-dimethyl-6-oxo-N-phenyl-1-cyclohexene-1-carboxamide (15.0g.), described in Example 1, and 3-(methylamino)propylamine is heated at 130°C. for 18 hr.

The mixture is cooled, diluted with ice water and extracted four times with 50 ml of chloroform. The combined extracts are washed with 30 ml of diluted HCl (1:1), dried over MgSO₄ and filtered. The product is precipitated by diluting the filtrate with absolute ether (200 ml). Crystalline material is collected by filtration and recrystallized several times from ethanol to yield the hydrochloride addition salt of the title compound, 4,4-dimethyl-2-[3-(methylamino)propylamino]-6-oxo-N-phenyl-1-cyclohexene-1-carboxamide hydrochloride, m.p. 224°–225°C.

In the same manner but replacing 2-benzylamino-4,4-dimethyl-6-oxo-N-phenyl-1-cyclohexene-1-carboxamide with an equivalent amount of 2-benzylamino-4,4-dimethyl-6-oxo-N-(p-chlorophenyl)-1-cyclohexene-1-carboxamide, described in Example 1, 4,4-dimethyl-2-[3-(methylamino)propylamino]-6-oxo-N-(p-chlorophenyl)-1-cyclohexene-1-carboxamide hydrochloride, m.p. 246°–248°C., is obtained.

The title compound (free base, $\gamma_{max}^{CHCl}$ 1632 cm.⁻¹) or its corresponding p-chloro analog, 4,4-dimethyl-2-[3-(methylamino)propylamino]-6-oxo-N-(p-chlorophenyl)-2-cyclohexen-1-carboxamide (free base, $\gamma_{max}^{CHCl}$ 1632 cm.⁻¹) are obtained by decomposing the corresponding hydrochloride acid addition salt, described above, for example, by washing a chloroform solution of the salt with 10 percent sodium hydroxide solution, followed by evaporation of the solvent.

The procedure of Example 65 may be followed to prepare other compounds of formula I in which $R^1$, $R^2$, $R^3$ and X are as defined in the first instance and NH- (Alk)—Y represents a lower amino(lower)alkylamino in which Alk is as defined in the first instance and Y is lower alkylamino. Examples of such compounds are listed in Tables V and VI. The requisite vinylogous amides of formula III and aminoalkylamines are used as starting materials in the same proportions as described for the vinylogous amide and aminoalkylamine in Example 65. In each case the vinylogous amide is noted by the example describing its preparation.

TABLE V

| Ex. | No. of Example Describing the Starting Material | Alkylamine of Formula $NH_2$–(Alk)–Y | | Product: (Prefix Listed Below)-6-Oxo-1-Cyclohexene-1-Carboxamide |
|---|---|---|---|---|
| | | Alk | Y | |
| 66 | 1(p-chloro analog of title compound) | $CH_2CH_2CH_2$ | $C_2H_5NH$ | 2-[3-(ethylamino)propylamino]-4,4-dimethyl-N-(p-chlorophenyl) |
| 67 | 4 | $CH_2CH(CH_3)CH_2$ | $n-C_3H_7NH$ | 2-[3-(propylamino)-2-methylpropylamino]-N-isopropyl |
| 68 | 5 | $CH_2CH_2$ | $t-C_4H_9NH$ | 2-[2-(t-butylamino)ethylamino]-N-n-hexyl |
| 69 | 6 | $CH_2CH_2$ | $CH_3NH$ | 2-[2-(methylamino)ethylamino]-N-phenyl** |
| 70 | 9 | $CH_2CH_2$ | $CH_3NH$ | 2-[2-(methylamino)ethylamino]-4,4-dimethyl-N-methyl |
| 71 | 10 | $CH_2CH(CH_3)CH_2$ | $n-C_6H_{13}NH$ | 2-[3-(n-hexylamino)-2-methylpropylamino]-4,4-dimethyl-N-t-butyl |
| 72 | 15 | $CH_2CH_2CH_2CH_2$ | $n-C_4H_9NH$ | 2-[4-(butylamino)butylamino]-4,4-diethyl-N-phenyl |
| 73 | 16 | $CH_2CH_2CH_2$ | $C_2H_5NH$ | 2-[3-(ethylamino)propylamino]-4,4-diethyl-N-(p-fluorophenyl) |
| 74 | 20 | $CH_2CH_2$ | $CH_3NH$ | 2-[2-(methylamino)ethylamino]-4,4-dipropyl-N-phenyl |
| 75 | 21 | $CH(CH_3)CH_2$ | $i-C_3H_7NH$ | 2-[2-(isopropylamino)propylamino]- and 2-[2-(isopropylamino)-1-methylethylamino]-4,4-dipropyl-N-(p-ethoxyphenyl)* |

*This product mixture may be separated by fractional crystallizations of the hydrochloride salts.
**Isolated as hydrochloride, m.p. 211°–213° C.

TABLE VI

| Ex. | No. of Example Describing the Starting Material | Alkylamine of Formula $NH_2$–(Alk)–Y | | Product: (Prefix Listed Below)-6-Oxothio-1-Cyclohexene-1-Carboxamide |
|---|---|---|---|---|
| | | Alk | Y | |
| 76 | 23 | $CH_2CH_2CH_2$ | $CH_3NH$ | 2-[3-(methylamino)propylamino]-4,4-dimethyl-N-phenyl |
| 77 | 26 | $CH_2CH(CH_3)CH_2$ | $CH_3NH$ | 2-[3-(methylamino)-2-methyl-propylamino]-N-n-hexyl |
| 78 | 27 | $CH_2CH_2$ | $C_2H_5NH$ | 2-[2-(ethylamino)ethylamino]-N-phenyl |
| 79 | 31 | $CH_2CH_2CH_2CH_2$ | $n-C_6H_{13}NH$ | 2-[4-(n-hexylamino)butylamino]-4,4-dimethyl-N-t-butyl |
| 80 | 32 | $CH_2CH_2$ | $t-C_4H_9NH$ | 2-[2-(t-butylamino)ethylamino]-4,4-dimethyl-N-(p-ethoxyphenyl) |
| 81 | 36 | $CH_2CH_2CH_2$ | $CH_3NH$ | 2-[3-(methylamino)propylamino]-4,4-diethyl-N-phenyl |
| 82 | 41 | $CH_2CH_2$ | $n-C_5H_{11}NH$ | 2-[2-(n-pentylamino)ethylamino]-4,4-dipropyl-N-phenyl |
| 83 | 42 | $CH_2CH_2$ | $i-C_3H_7NH$ | 2-[2-(isopropylamino)ethylamino]-4,4-dipropyl-N-(p-chlorophenyl) |

EXAMPLE 84

2-[3-(dimethylamino)propylamino]-4,4-dimethyl-6-oxo-N-phenyl-1-cyclohexene-1-carboxamide (I; $R^1$ and $R^2$=$CH_3$, $R^3$=phenyl, X=O, Alk=$(CH_2)_3$ and Y=$N(CH_3)_2$.

The vinylogous amide, 2-benzylamino-4,4-dimethyl-6-oxo-N-phenyl-1-cyclohexene-1-carboxamide (20.0 g.), described in Example 1, is suspended in 20.0 g. of 3-(dimethylamino)propylamine and the mixture is heated at 130°–140°C. for 24 hrs. An excess of free amine is removed under reduced pressure and the residue dissolved in 150 ml of diluted HCl (1:10). The aqueous solution is extracted with benzene and ether. The extract is filtered with charcoal. The filtrate is rendered basic with 50 ml of 15% NaOH and extracted with chloroform exhaustively. The combined extracts are washed with water, sat'd. NaCl solution, dried over $MgSO_4$, filtered and then acidified with solution of HCl in ether. Solvents are evaporated. The remaining solid is dissolved in 100 ml of absolute acetone and allowed to stand for 3 days in a refrigerator. The precipitate is collected yielding the hydrochloride acid addition salt of the title compound, 2-[3-(dimethylamino)propylamino]-4, 4-dimethyl-6-oxo-N-phenyl-1- cyclohexene-1-carboxamide hydrochloride, m.p. 192–194°C.

The title compound (free base, $\gamma_{max}^{CHCl_3}$ 1630 cm.$^{-1}$) is obtained by decomposing the hydrochloric acid addition salt, for example, by washing a chloroform solution of the salt with 10 percent sodium hydroxide solution and evaporating the solvent.

The procedure of Example 84 may be followed to prepare other compounds of formula I in which $R^1$, $R^2$, $R^3$ and X are as defined in the first instance and NH–(Alk)–Y represents amino(lower)alkylamino in which Alk is as defined in the first instance and Y is di(lower)alkylamino. Examples of such compounds are listed in Tables VII and VIII. The requisite vinylogous amides of formula III and aminoalkylamines are used as starting materials in the same proportions as described for the vinylogous amide and aminoalkylamine in Example 84. In each case the vinylogous amide is noted by the example describing its preparation.

TABLE VII

| Ex. | No. of Example Describing the Starting Material | Alkylamine of Formula $NH_2$–(Alk)–Y | | Product: (Prefix Listed Below)-6-Oxothio-1-Cyclohexene-1-Carboxamide |
|---|---|---|---|---|
| | | Alk | Y | |
| 85 | 1(p-chloro analog of title compound) | $CH_2CH_2CH_2$ | $(CH_3)_2N$ | 2-[3-(dimethylamino)propylamino]-4,4-dimethyl-N-(p-chlorophenyl) |
| 86 | 8 | $CH_2CH(CH_3)CH_2$ | $(C_2H_5)_2N$ | 2-[3-(diethylamino)-2-methyl-propylamino]-N-(p-methoxyphenyl) |
| 87 | 10 | $CH_2CH_2$ | $(n-C_3H_7)_2N$ | 2-[2-(dipropylamino)ethylamino]-4,4-dimethyl-N-t-butyl |
| 88 | 11 | $CH_2CH_2CH_2CH_2$ | $(n-C_4H_9)_2N$ | 2-[4-(dibutylamino)butylamino]-4,4-dimethyl-N-(p-ethoxyphenyl) |
| 89 | 15 | $CH_2CH_2$ | $(CH_3)_2N$ | 2-[2-(dimethylamino)ethylamino]-4,4-diethyl-N-phenyl |
| 90 | 17 | $CH_2CH_2CH_2$ | $(n-C_4H_9)_2N$ | 2-[3-(dibutylamino)propylamino]-4,4-diethyl-N-(p-methoxyphenyl) |
| 91 | 19 | $CH_2CH_2$ | $CH_3(C_2H_5)N$ | 2-[2-(ethylmethylamino)ethylamino]-4,4-dipropyl-N-butyl |
| 92 | 22 | $CH_2CH_2$ | $CH_3(n-C_3H_7)N$ | 2-[2-(methylpropylamino)ethylamino]-4,4-dipropyl-N-(p-ethoxyphenyl) |

TABLE VIII

| Ex. | No. of Example Describing the Starting Material | Alkylamine of Formula NH$_2$—(Alk)—Y | | Product: (Prefix Listed Below)-6-Oxothio-1-Cyclohexene-1-Carboxamide |
|---|---|---|---|---|
| | | Alk | Y | |
| 93 | 24 | CH$_2$CH$_2$ | (C$_2$H$_5$)$_2$N | 2-[2-(diethylamino)ethylamino]-N-methyl |
| 94 | 28 | CH$_2$CH(CH$_3$)CH$_2$ | (C$_2$H$_5$)$_2$N | 2-[3-(diethylamino)-2-methylpropylamino]-N-(p-iodophenyl) |
| 95 | 29 | CH$_2$CH$_2$ | (n-C$_3$H$_7$)$_2$N | 2-[2-(dipropylamino)ethylamino]-N-(p-propoxyphenyl) |
| 96 | 33 | CH$_2$CH$_2$CH$_2$CH$_2$ | (n-C$_4$H$_9$)$_2$N | 2-[4-(dibutylamino)butylamino]-4,4-dimethyl-N-(p-isopropoxyphenyl) |
| 97 | 37 | CH$_2$CH$_2$ | (CH$_3$)$_2$N | 2-[2-(dimethylamino)ethylamino]-4,4-diethyl-N-(p-fluorophenyl) |
| 98 | 39 | CH$_2$CH$_2$CH$_2$ | (n-C$_4$H$_9$)$_2$N | 2-[3-(dibutylamino)propylamino]-4,4-dipropyl-N-ethyl |
| 99 | 40 | CH$_2$CH$_2$ | (CH$_3$C$_2$H$_5$)N | 2-[2-(ethylmethylamino)ethylamino]-4,4-dipropyl-N-butyl |
| 100 | 41 | CH$_2$CH$_2$ | CH$_3$(n-C$_3$H$_7$)N | 2-[2-(methylpropylamino)ethylamino]-4,4-dipropyl-N-phenyl |
| 101 | 43 | CH$_2$CH$_2$CH$_2$ | (n-C$_3$H$_7$)$_2$N | 2-[3-(dipropylamino)propylamino]-4,4-dipropyl-N-(p-ethoxyphenyl) |

EXAMPLE 102

2-(2-Hydroxypropylamino)-4,4-dimethyl-6-oxo-N-phenyl-1-cyclohexene-1-carboxamide (I, R$^1$ and R$^2$=CH$_3$, R$^3$=phenyl, X=0, Alk=CH$_2$CH(CH$_3$), and Y=OH').

A mixture of the vinylogous amide, 2-benzylamino-4,4-dimethyl-6-oxo-N-phenyl-1-cyclohexene-1-carboxamide (10.0 g), described in Example 1, and 30 ml. of 1-amino-2-propanol is heated at 110°–120°C. for 15 hr., then at 160°C. for 5 hr. The reaction mixture is cooled to 50°–60° and distributed between ice water and chloroform. Organic layer is washed with diluted HCl, water, sat'd. NaCl soln. and dried over MgSO$_4$. The organic extract is evaporated and the residue applied to a column of silica gel. Elustion is begun with benzene-chloroform, chloroform, and finally 1 percent of MeOH in chloroform. The main fraction is collected and recrystallized twice from benzene to give the title compound colorless prismatic crystals, m.p. 160°–161°C., $\gamma_{max}^{CHCl_3}$ 3450–3300, 1625, 1605, 1594, 1570, 1530, 1445 cm.$^{-1}$.

The procedure of Example 102 may be followed to prepare other compounds of formula I in which R$^1$, R$^2$, R$^3$ and X are as defined in the first instance and NH—(Alk)—Y represents a hydroxyalkylamino in which Alk is as defined in the first instance and Y is hydroxy.

Example of such compounds are listed in Tables IX and X. The requisite vinylogous amides of formula III and aminoalkylamines are used as starting materials in the same proportions as described for the vinylogous amide and aminoalkylamine in Example 102. In each case the vinylogous amide is noted by the example describing its preparation.

TABLE IX

| Ex. | No. of Example Describing the Starting Material | Alkylamine of Formula NH$_2$—(Alk)—Y | | Product: (Prefix Listed Below)-6-Oxo-1-Cyclohexene-1-Carboxamide |
|---|---|---|---|---|
| | | Alk | Y | |
| 103 | 1 (title compound) | CH$_2$CH$_2$CH$_2$ | OH | 2-(3-hydroxypropylamino)-4,4-dimethyl-N-phenyl |
| 104 | 2 | CH$_2$CH(CH$_3$)CH$_2$ | OH | 2-(3-hydroxy-2-methylpropylamino)-N-methyl |
| 105 | 7 | CH$_2$CH$_2$ | OH | 2-(2-hydroxyethylamino)-N-(p-bromophenyl) |
| 106 | 9 | CH$_2$CH$_2$CH$_2$CH$_2$ | OH | 2-(4-hydroxybutylamino)-4,4-dimethyl-N-methyl |
| 107 | 13 | CH$_2$CH$_2$ | OH | 2-(2-hydroxyethylamino)-4,4-diethyl-N-ethyl |
| 108 | 17 | CH$_2$CH$_2$CH$_2$ | OH | 2-(3-hydroxypropylamino)-4,4-diethyl-N-(p-methoxyphenyl) |
| 109 | 19 | CH$_2$CH$_2$ | OH | 2-(2-hydroxyethylamino)-4,4-dipropyl-N-butyl |
| 110 | 20 | CH$_2$CH$_2$ | OH | 2-(2-hydroxyethylamino)-4,4-dipropyl-N-phenyl |

TABLE X

| Ex. | No. of Example Describing the Starting Material | Alkylamine of Formula NH$_2$—(Alk)—Y | | Product: (Prefix Listed Below)-6-Oxothio-1-Cyclohexene-1-Carboxamide |
|---|---|---|---|---|
| | | Alk | Y | |
| 111 | 23 | CH$_2$CH$_2$CH$_2$ | OH | 2-(3-hydroxypropylamino)-4,4-dimethyl-N-phenyl |
| 112 | 26 | CH$_2$CH(CH$_3$)CH$_2$ | OH | 2-(3-hydroxy-2-methylpropylamino)-N-n-hexyl |
| 113 | 29 | CH$_2$CH$_2$ | OH | 2-(2-hydroxyethylamino)-N-(p-propoxyphenyl) |
| 114 | 31 | CH$_2$CH$_2$CH$_2$CH$_2$ | OH | 2-(4-hydroxybutylamino)-4,4-dimethyl-N-t-butyl |
| 115 | 34 | CH$_2$CH$_2$ | OH | 2-(2-hydroxyethylamino)-4,4-diethyl-N-ethyl |
| 116 | 36 | CH$_2$CH$_2$CH$_2$ | OH | 2-(3-hydroxypropylamino)-4,4-diethyl-N-phenyl |
| 117 | 39 | CH$_2$CH$_2$ | OH | 2-(2-hydroxyethylamino)-4,4-dipropyl-N-ethyl |
| 118 | 42 | CH$_2$CH$_2$ | OH | 2-(2-hydroxyethylamino)-4,4-dipropyl-N-(p-chlorophenyl) |

I claim:

1. A compound of the formula I

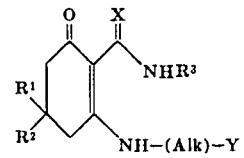

in which R$^1$ and R$^2$ both are hydrogen or lower alkyl; R$^3$ is lower alkyl, phenyl, p-halophenyl or p-lower alkoxyphenyl; X is oxygen or sulfur; and NH—(alk)—Y represents an amino(lower)alkylamino, lower alkylamino(lower)alkylamino, di(lower)alkylamino(lower)alkylamino or hydroxy(lower)alkylamino in which Alk is an alkylene radical containing two to four carbon atoms, and Y is amino, lower alkylamino, di(lower)alkylamino or hydroxy.

2. A pharmaceutically acceptable acid addition salt of the compound of formula I in which Y is selected from the group consisting of amino, lower alkylamino and di(lower)alkylamino.

3. 2-(2-aminoethylamino-4,4-dimethyl-6-oxo-N-phenyl-1-cyclohexene-1-carboxamide, as claimed in claim 1.

4. 2-(2-aminoethylamino)-4,4-dimethyl-6-oxo-N-phenyl-1-cyclohexene-1-carboxamide hydrochloride, as claimed in claim 2.

5. 4,4-dimethyl-2-[3-(methylamino)propylamino]-6-oxo-N-phenyl-1-cyclohexen-1-carboxamide, as claimed in claim 1.

6. 4,4-dimethyl-2-[3-(methylamino)propylamino-6-oxo-N-phenyl-1-cyclohexen-1-carboxamide hydrochloride, as claimed in claim 2.

7. 4,4-dimethyl-2-[3-(methylamino)propylamino]-6-oxo-N-(p-chlorophenyl)-1-cyclohexen-1-carboxamide, as claimed in claim 1.

8. 4,4-dimethyl-2-[3-(methylamino)propylamino]-6-oxo-N-(p-chlorophenyl)-1-cyclohexen-1-carboxamide hydrochloride, as claimed in claim 2.

9. 2-[2-(methylamino)ethylamino]-N-phenyl-6-oxo-1-cyclohenene-1-carboxamide hydrochloride, as claimed in claim 2.

10. 2-[3-(dimethylamino)propylamino]-4,4-dimethyl-6-oxo-N-phenyl-1-cyclohexene-1-carboxamide, as claimed in claim 1.

11. 2-[3-(dimethylamino)propylamino]-4,4-dimethyl-6-oxo-N-phenyl-1-cyclohexene-1-carboxamide hydrochloride, as claimed in claim 2.

12. 2-(2-hydroxypropylamino)-4,4-dimethyl-6-oxo-N-phenyl-1-cyclohexene-1-carboxamide, as claimed in claim 1.

* * * * *